United States Patent
Mattmuller et al.

(10) Patent No.: US 10,243,191 B2
(45) Date of Patent: Mar. 26, 2019

(54) FLEXIBLE MULTI-LAYERED BUS BAR

(71) Applicant: Ford Global Technologies, LLC, Dearborn, MI (US)

(72) Inventors: Stephenson Tyler Mattmuller, Detroit, MI (US); Urban J. De Souza, Rochester Hills, MI (US); Tom M. Gunther, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 182 days.

(21) Appl. No.: 15/216,111

(22) Filed: Jul. 21, 2016

(65) Prior Publication Data

US 2018/0026250 A1 Jan. 25, 2018

(51) Int. Cl.
| | |
|---|---|
| *H01M 2/20* | (2006.01) |
| *H01M 2/30* | (2006.01) |
| *H01R 43/02* | (2006.01) |
| *H01R 9/18* | (2006.01) |
| *B60L 11/18* | (2006.01) |

(52) U.S. Cl.
CPC .......... *H01M 2/206* (2013.01); *H01M 2/30* (2013.01); *H01R 9/18* (2013.01); *H01R 43/0207* (2013.01); *B60L 11/1879* (2013.01); *H01M 2220/20* (2013.01); *Y02T 10/705* (2013.01)

(58) Field of Classification Search
CPC .... H01M 2/206; H01M 2/30; H01M 2220/20; H01R 9/18; H01R 43/0207
See application file for complete search history.

(56) References Cited

U.S. PATENT DOCUMENTS

| | | | |
|---|---|---|---|
| 2,790,656 A | 4/1957 | Cook | |
| 6,538,203 B1 | 3/2003 | Nölle et al. | |
| 7,413,489 B1 | 8/2008 | LaSalvia et al. | |
| 8,999,081 B2 * | 4/2015 | Willis | B23K 20/021 |
| | | | 148/516 |
| 9,287,547 B2 | 3/2016 | Widhalm | |

(Continued)

FOREIGN PATENT DOCUMENTS

| | | | |
|---|---|---|---|
| CN | 2012-04069 | * | 3/2009 |
| CN | 201204069 | | 3/2009 |

OTHER PUBLICATIONS

Csanyi, Copper or Aluminum? Which to use and when? Retrieved Jun. 3, 2016 from http://electrical-engineering-portal.com/copper-or-aluminium.

*Primary Examiner* — Brittany L Raymond
(74) *Attorney, Agent, or Firm* — Carlson, Gaskey & Olds, P.C.

(57) ABSTRACT

An exemplary bus bar assembly includes a first layer and a second layer directly adjacent the first layer. The first layer and the second layer each have a section made of a first material and extending from a first end portion to an opposing, second end portion. The first and second end portions include a second material different than the first material. An exemplary method of forming a bus bar includes joining a section of a first bus bar layer and a section of a second bus bar layer to a respective first end portion and a respective second end portion. The sections of the first and second bus bar layers are made of a first material. The first and second end portions include a second material different than the first material.

21 Claims, 5 Drawing Sheets

(56) References Cited

U.S. PATENT DOCUMENTS

| | | | |
|---|---|---|---|
| 2012/0305283 A1* | 12/2012 | Kalayjian | H05K 7/1432 174/68.2 |
| 2014/0000927 A1* | 1/2014 | Hashimoto | H02G 5/005 174/68.2 |
| 2015/0171401 A1* | 6/2015 | Kim | H01M 2/206 429/158 |
| 2016/0151853 A1* | 6/2016 | Lee | B23K 20/10 219/137 R |

* cited by examiner

FLEXIBLE MULTI-LAYERED BUS BAR

TECHNICAL FIELD

This disclosure relates generally to a bus bar for an electrified vehicle and, more particularly, to a flexible bus bar having multiple layers.

BACKGROUND

Electrified vehicles differ from conventional motor vehicles because electrified vehicles are selectively driven using one or more electric machines powered by a battery pack. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

A battery pack of an electrified vehicle can include a plurality of battery cell assemblies arranged in one or more battery arrays. Bus bars can be used to distribute power to and from the battery cell assemblies, and to and from the battery pack. Bus bars are typically copper and can add significant weight to the electrified vehicle.

SUMMARY

A bus bar assembly according to an exemplary aspect of the present disclosure includes, among other things, a first layer, and a second layer directly adjacent the first layer. The first layer and the second layer each have a section made of a first material. The section extends from a first end portion to an opposing, second end portion. The first and second end portions include a second material different than the first material.

In a further non-limiting embodiment of the foregoing bus bar assembly, the first material and the second material are metallic materials.

In a further non-limiting embodiment of any of the foregoing bus bar assemblies, the first material comprises aluminum and the second material comprises copper.

In a further non-limiting embodiment of any of the foregoing bus bar assemblies, the first material forms a non-conductive oxide layer under given atmospheric conditions at a first rate, and the second material forms a non-conductive oxide layer under the given atmospheric conditions at a second rate that is slower than the first rate.

In a further non-limiting embodiment of any of the foregoing bus bar assemblies, the assembly includes a soldering alloy covering at least some of the first and second end portions.

In a further non-limiting embodiment of any of the foregoing bus bar assemblies, the soldering alloy joins the first end portion of the first layer to the first end portion of the second layer, and the soldering alloy joins the second end portion of the second layer to the second end portion of the second layer.

In a further non-limiting embodiment of any of the foregoing bus bar assemblies, the first and second end portions are roll bonded to the section.

In a further non-limiting embodiment of any of the foregoing bus bar assemblies, the assembly includes a polymer coating covering the first layer and the second layer.

In a further non-limiting embodiment of any of the foregoing bus bar assemblies, the assembly includes a first traction battery terminal and a second traction battery terminal. The first ends of the first and second layers are secured directly to the first traction battery terminal. The second ends of the first and second layers are secured directly to the second traction battery terminal.

In a further non-limiting embodiment of any of the foregoing bus bar assemblies, the first and second layers extend nonlinearly between the first traction battery terminal and the second traction battery terminal.

In a further non-limiting embodiment of any of the foregoing bus bar assemblies, the assembly includes an area of the section ultrasonically welded to another area of the section.

In a further non-limiting embodiment of any of the foregoing bus bar assemblies, the assembly includes a third layer directly adjacent the second layer. The third layer has a section made of the first material and extending from a first end portion to an opposing, second end portion. The first and second end portions of the third layer are made of the second material that is different than the first material.

A method of forming a bus bar according to an exemplary aspect of the present disclosure includes, among other things, joining a section of a first bus bar layer and a section of a second bus bar layer to a respective first end portion and a respective second end portion. The sections of the first and second bus bar layers are made of a first material. The first and second end portions include a second material different than the first material.

In a further non-limiting embodiment of the foregoing method, the method includes securing the first end portions of the first and second bus bar layers to a first traction battery terminal and securing the second end portions of the first and second bus bar layers to a second traction battery terminal.

In a further non-limiting embodiment of any of the foregoing methods, the method includes bending the first and second layers such that the first and second layers extend nonlinearly from the first traction battery terminal to the second traction battery terminal.

In a further non-limiting embodiment of any of the foregoing methods, the sections of the first and second bus bar layers directly contact each other after the securing.

In a further non-limiting embodiment of any of the foregoing methods, the method includes covering at least some areas of the first and second end portions with a soldering alloy, and covering at least some areas of the first and second layers with a polymer coating.)

In a further non-limiting embodiment of any of the foregoing methods, the bonding includes roll bonding the first and second end portions to the section.

In a further non-limiting embodiment of any of the foregoing methods, the first and second layers have a rectangular cross-sectional profile.

In a further non-limiting embodiment of any of the foregoing methods, the method includes increasing a length of the section by welding another section of the first material to the section.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to a bus bar of an electrified vehicle. The bus bar includes multiple layers. Portions of the layers are made of a relatively light material, such as an aluminum material. The bus bar can be flexed and bent to accommodate positioning in various configurations within the electrified vehicle.

Figure 1:
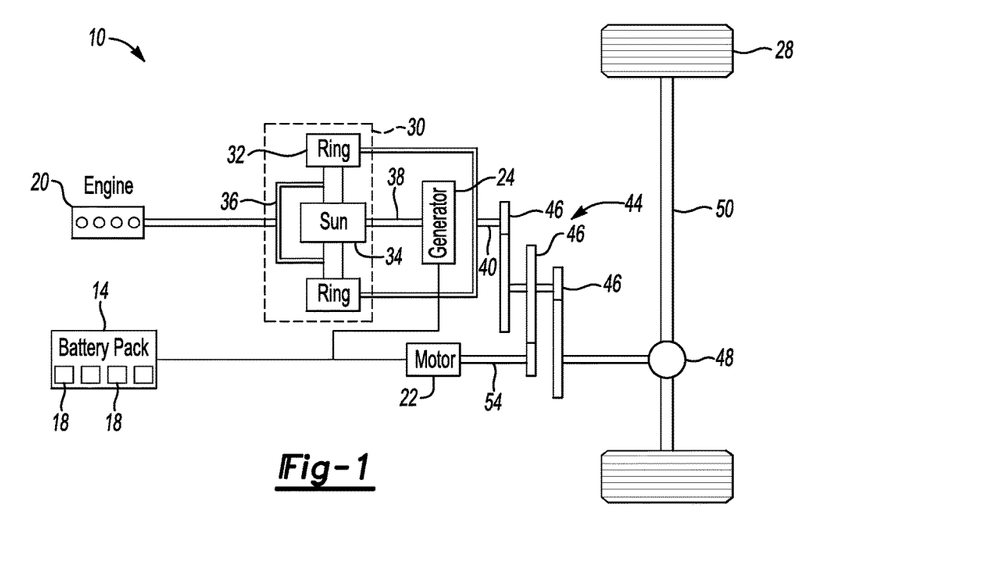
FIG. 1 illustrates a schematic view of an example powertrain of an electrified vehicle.

Referring to FIG. 1, a powertrain 10 of a hybrid electric vehicle (HEV) includes a battery pack 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
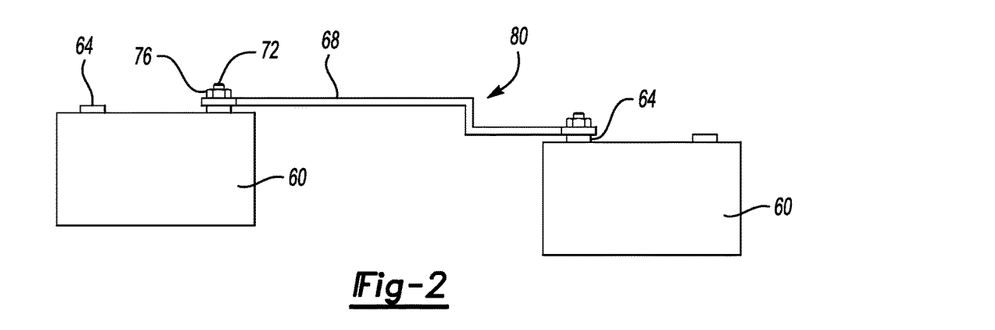
FIG. 2 shows a partially schematic view of a bus bar having a bent portion and electrically coupling a terminal of a first battery cell assembly and a terminal of a second battery cell assembly.
Figure 3:
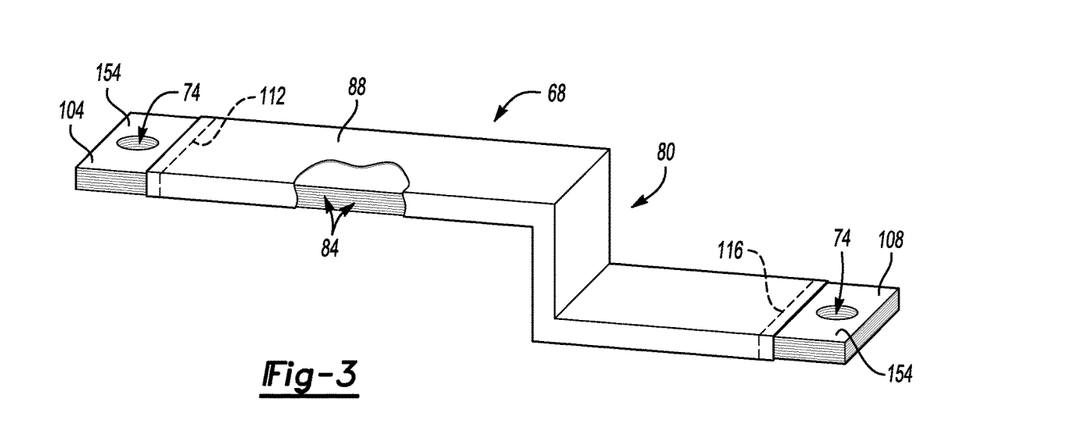
FIG. 3 shows a perspective view of the bus bar of FIG. 2 with selected portions cut away to reveal layers of the bus bar.

Referring now to FIGS. 2 and 3 with continuing reference to FIG. 1, the battery arrays 18 include a plurality of battery cell assemblies 60. Several of the battery cell assemblies 60 can be positioned adjacent each other along an axis.

Terminals 64 extend from the battery cell assemblies 60. A bus bar 68 electrically couples the terminal 64 of one of the battery cell assemblies 60 to the terminal 64 of another of the battery cell assemblies 60.

Although shown as connected to the terminals 64 of different battery cell assemblies 60, the bus bar 68 could be used in other ways. The bus bar 68 could, for example, be used to additionally distribute power to and from the battery pack 14. In such an example, the bus bar 68 could electrically couple the battery pack 14 to a structure outside the battery pack 14, such as an inverter. The bus bar 68 could also electrically connect more than two terminals. Thus, this disclosure should not be construed at limited to bus bars that exclusively connect to the terminals 64.

A threaded terminal connector 72 is used to couple the bus bar 68 to each of the terminals 64. At each terminal 64, the threaded terminal connector 72 extends through an aperture 74 in the bus bar 68. A nut 76 is torqued down over the threaded terminal connector 72 to clamp the bus bar 68 against the terminal 64.

The example bus bar 68 includes a bent portion 80. Incorporating the bent portion 80 into the bus bar can be required to accommodate the positioning of the terminals 64 connected to the bus bar 68. Incorporating the bent portion 80 could be required to connect the bus bar 68 to structures other than the terminals 64, such as structures outside the battery pack 14. The bent portion 80 permits, for example, a 90 degree turn in the bus bar 68, which can provide packaging flexibility. Prior art round wires can bend, but require a turn radius, and thus more packaging space.

The example bus bar 68 includes a plurality of layers 84 stacked on top of one another. The layers 84 facilitate bending and flexing the bus bar 68. That is, the bus bar 68, which incorporates the layers 84, can bend and flex more easily than a similarly sized bus bar that does not include the layers 84.

The layers 84 are electrically conductive. When the layers 84 are stacked, a coating 88, such as a polymer coating, covers at least a portion of the layers 84. The coating 88 can protect and electrically isolate the layers 84 from structures other than the terminals 64, which can prevent the bus bar 68 from shorting against other areas of the battery pack 14.

Figure 4:
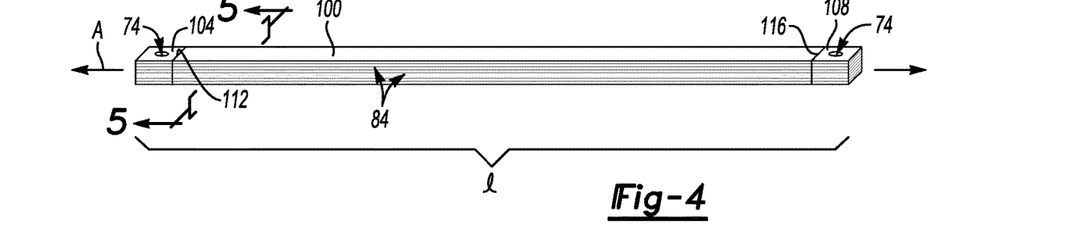
FIG. 4 shows a perspective view of the layers of the bus bar of FIG. 3 in a stacked configuration prior to forming the bent portion.
Figure 5:
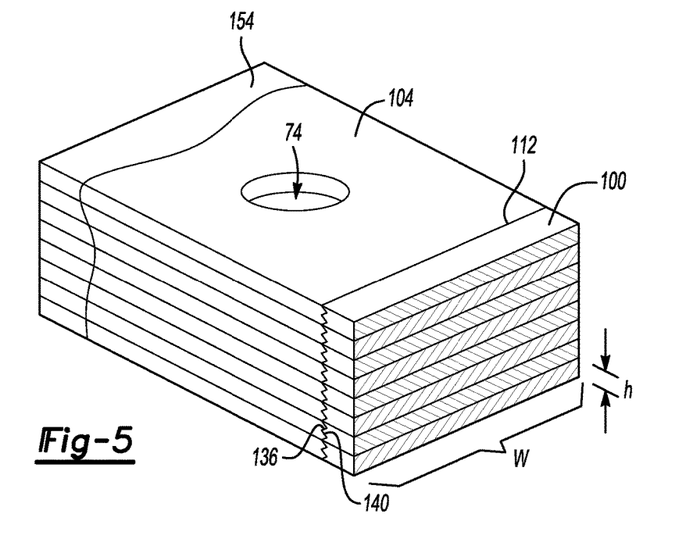
FIG. 5 shows a section view at line 5-5 in FIG. 4.

Referring to FIGS. 4 and 5, the layers 84 of the bus bar 68 are shown in a stacked position prior to applying the coating 88 and prior to bending and flexing to form the bent portion 80 of FIGS. 2 and 3. The layers 84 each have a rectangular profile with a length l, a width w, and a height h.

Each of the layers 84 include a section 100 extending linearly along a longitudinal axis A from a first end portion 104 to a second end portion 108 opposite the first end portion 104. The first end portion 104 joins to the section 100 at a first interface 112. The second end portion 108 joins to the section 100 at a second interface 116.

The section 100 is made of a first material. The first and second end portions 104, 108 are made of a second material different than the first material.

In an exemplary non limiting embodiment, the first material is aluminum, and the second material is copper. Aluminum is lighter than copper. Thus, the layer 84, which incorporates aluminum as the section 100, is lighter than if the layer were exclusively copper. The first material is not limited to aluminum, and the second material is not limited to copper. Various materials could be used. The first and second materials could be a material compositions. That is, the first and second materials could each be combinations of more than one material.

Although, for a given cross-sectional size, the ampacity of aluminum can be less than copper, increasing the cross-sectional size of the aluminum can provide a desired ampacity. For a given ampacity, copper can be about 1.65 times heavier than aluminum.

If the layers 84 were entirely aluminum, sharing current between the all-aluminum layers would be difficult. Exposed surfaces of aluminum, as is known, can oxide and inhibit current passage. Incorporating the first and second end portions 104, 108, which are made of a material different than aluminum, can facilitate sharing current between the layers 84.

In a non-limiting embodiment, the first material forms a non-conductive oxide layer under given atmospheric conditions at a first rate, and the second material forms a non-conductive oxide layer under the given atmospheric conditions at a second rate that is slower than the first rate. For example, if the first material of the section 100 is aluminum, the first material oxidizes more quickly than the second material, which could be copper.

Figure 6:
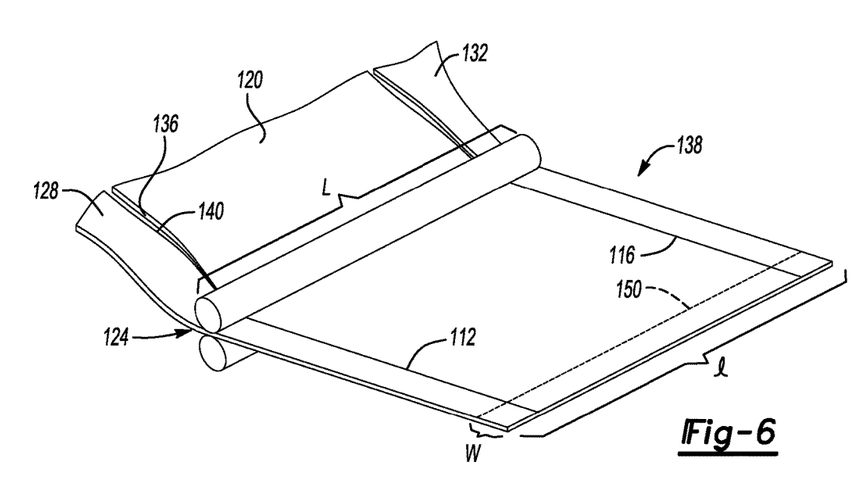
FIG. 6 shows a stage in a roll bonding process used to form a layer of the bus bar of FIG. 3.
Figure 7:
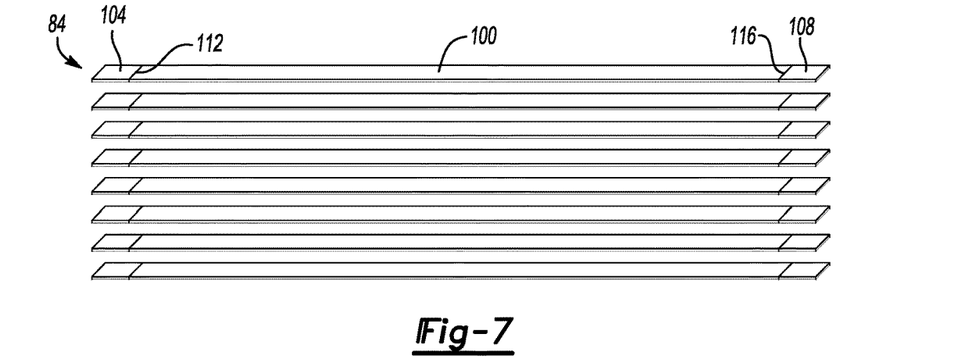
FIG. 7 shows an exploded view of layers in the bus bar of FIG. 3.
Figure 8:
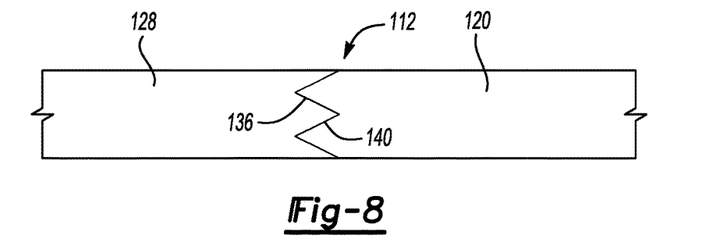
FIG. 8 shows an example bi-metallic interface for use in connection with the bus bar of FIG. 3.

Referring now to FIGS. 6-8 with continuing reference to FIGS. 2-5, a roll bonding process can be used to secure the first and second end portions 104 and 108 to the section 100. During the roll bonding, a strip 120 of the first material is fed between a pair of rollers 124. At the outer lateral ends, a strip 128 and a strip 132 of the second material are fed between the rollers 124.

The rollers 124 rotate and apply pressure to cold weld the strip 128 and the strip 132 to opposite sides of the strip 120. The roll bonding provides a bi-metallic sheet of material 138 having the second material bonded to the first material at opposing sides. The first interface 112 and second interface 116 are bi-metallic junctions in this example.

In a non-limiting embodiment, the interface 112, the interface 116, or both includes triangular protrusions received within grooves. The edges 136 of the strip 120 could be machined with grooves to receive the protrusions machined into an edge 140 of the strip 128 for example. The protrusions and grooves can facilitate a robust connection between the strip 128 and the strip 120, and between the strip 132 and the strip 120 after the roll-bonding.

Figure 8A:
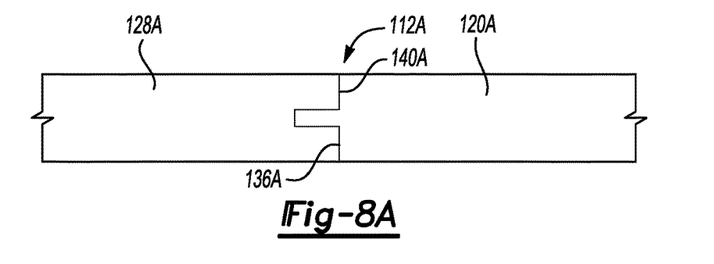
FIG. 8A shows another example bi-metallic interface for use in connection with the bus bar of FIG. 3.

In another non-limiting embodiment shown in FIG. 8A, a bi-metallic interface 112A after roll-forming includes a rectangular protrusion or tongue received within a groove. An edge 136A of a strip 120A could be machined with the rectangular protrusion, and the groove machined into an edge 140A of a strip 128A, or vice versa. The interface 112A could be used in place of the interface 112, the interface 116, or both.

Figure 8B:
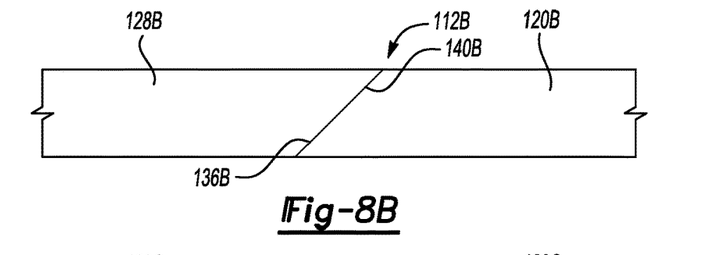
FIG. 8B shows yet another example bi-metallic interface for use in connection with the bus bar of FIG. 3.

In another non-limiting embodiment shown in FIG. 8B, a bi-metallic interface 112B after roll-forming includes an angled edge 136B of a strip 120B abutting and bonded to a corresponding angled edge 140B of a strip 128B. The interface 112B could be used in place of the interface 112, the interface 116, or both.

Figure 8C:
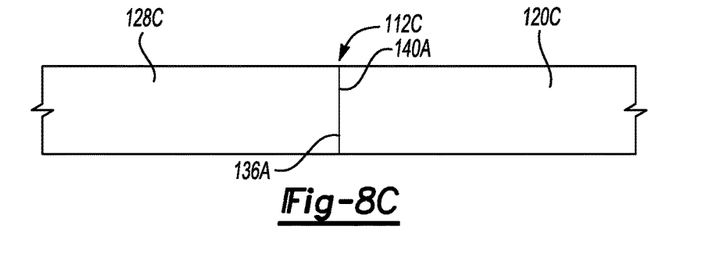
FIG. 8C shows still another example bi-metallic interface for use in connection with the bus bar of FIG. 3.

In another non-limiting embodiment shown in FIG. 8C, a bi-metallic interface 112C after roll-forming includes a flat edge 136C of a strip 120C butting against and bonded to a flat edge 140C of a strip 128C. The interface 112B is a butt-joint and could be used in place of the interface 112, the interface 116, or both.

The sheet of material 138 is cut at line 150 to provide one of the layers 84 of the bus bar 68, and cut again to provide additional layers 84. The layer 84 has the section 100 of the first material, and the first and second end portions 104, 108 of the second material. The positioning of the cut can be adjusted to adjust the width w of the layer 84.

The layers 84 are then moved from the position of FIG. 6 to the position of FIG. 7 where the layers 84 are stacked on one another.

In this example, the layers 84 are no more than 0.25 mm thick, and the bus bar 68 includes eight layers 84. Other thicknesses for the layers 84, and other numbers of the layers 84 can be used in other examples.

Prior to stacking, at least the end portions 104 and 108 could be coated with a tinning solder 154 to prevent, or inhibit, corrosion of the end portions 104 and 108. In one example, the exposed surfaces of the end portions 104, 108 are covered entirely by the tinning solder 154 and then the layers 84 are stacked. The tinning solder 154 bonds to the end portions 104, 108.

In some examples, the tinning solder 154 of one of the layers 84 bonds to the tinning solder 154 of the adjacent layer. This bond can prevent the layers 84 from moving relative to each other. For example, when the nut 76 is rotated to compress the end portions 104, 108 against the respective terminals 64, the bond between the tinning solder 154 of the layers 84 can prevent the layers 84 from twisting relative to each other.

Once the layers 84 are stacked, portions of the layers 84 are laminated with the coating 88. In this example, the coating 88 extends across the first interface 112 and the second interface 116 to cover at least some of the tinning solder 154. In other examples, the coating 88 covers tinning solder 154 and extends all the way to the ends of the bus bar 68.

The apertures 74 are then machined into the end portions 104, 108. In another example, the apertures 74 are machined prior to stacking the layers 84.

The bus bar 68 can be bent or flexed to conform to a particular dimension for incorporation within the battery pack 14 of FIG. 1. When the bus bar 68 is bent or flexed, the bus bar 68 extends along a nonlinear path from the first end portion 104 to the second end portion 108. The non-linear path is a path that varies from the axis A of FIG. 4.

In this example, the bus bar 68 is bent to provide the bent portion 80. A shield (not shown) could be secured over the bent portion 80 to provide further protection and ensure electric isolation in the area of the bent portion. The shield is a rubber material in some examples, or could be a tape wound around the bent portion 80.

In some examples, the stack of layers 84 shown in FIG. 4 is bent and then laminated with the coating 88 rather than laminating prior to the bending.

The layers 84 facilitates bending and manipulating the bus bar 68. Because the layers 84 include less copper than an all copper layer, a weight of the layers 84 is reduced, as well as an overall weight of the bus bar 68.

In this example, the sections 100 of the layers 84 directly contact one another, but current sharing between the sections 100, which are aluminum, is inhibited due to, among other things, oxidation. Incorporating the end portions 104 and 108 into the layers 84 addresses this issue.

In particular, when the first end portion 104 is clamped against the terminal 64, current can be shared between the layers 84 through the first end portions 104. When the second end portion 108 is clamped against the terminal 64, current can be shared between the layers 84 through the second end portions 108.

Incorporating the first end portions 104 and the second end portions 108 thus permits current sharing between the various layers of the bus bar 68. If the layers 84 were, for example, entirely aluminum, current could not be shared as effectively between the various layers, and the overall capacity of the bus bar 68 for distributing power would be reduced.

If more capacity for the bus bar 68 is desired, the number of layers 84 can be increased by stacking additional layers 84 on top of one another.

The length l of the layers 84 can be limited by a length l of the rollers 124. If the bus bar 68 is desired to be longer, the section 100 could be increased in length by cutting the section 100 and adding additional material sections of the first material.

Figure 9:
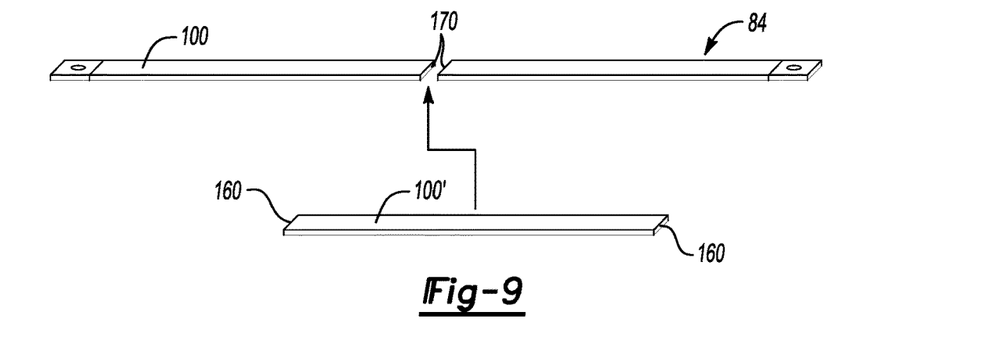
FIG. 9 shows a perspective view of a layer of the bus bar of FIG. 3 during a process to increase a length of the layer by adding an extender section.

For example, as shown FIG. 9, the section 100 of the layers 84 could be cut, and an extender section 100' positioned within the cut. Edges 160 of the extender section 100' can be ultrasonically welded to the edges 170 of the section 100 to increase an effective length of the section 100 and the overall length of the layers 84.

Figure 9A:
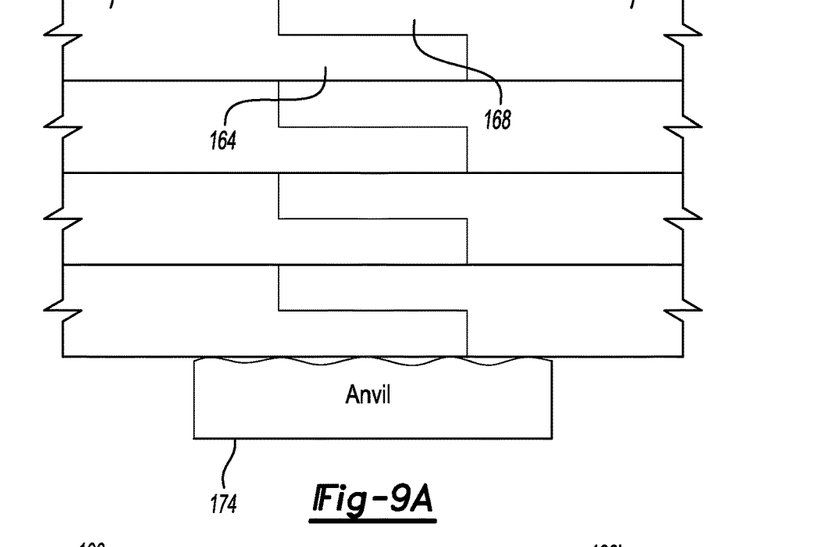
FIG. 9A shows an example of layers of the bus bar of FIG. 3 during a process to increase a length of the layers by adding corresponding extender sections.

Referring to FIG. 9A, multiple sections 100 could be ultrasonically welded, or otherwise secured to corresponding extender sections 100'. Four sections 100 are welded to four corresponding extender sections 100' in FIG. 9A, but other numbers could be welded. In some examples, the sections 100 are individually welded to corresponding extender section 100' so that the resulting layers are able to move relative to each other when bending the bus bar, if required.

When ultrasonically welding, a portion 164 of the section 100 overlaps with a portion 168 of the extender section 100'. The overlapping portions 164, 168 are held between a sonotrode 172 and an anvil 174. The sonotrode then applies ultrasonic vibrations at, for example, 20 kilohertz, to join the portions 164 and 168.

The overlapping portions 164, 168 enable the resulting section 100 joined with the extender section 100' to have a consistent cross-section, which can facilitate covering sections 100 and extender sections 100' with the coating 88 (FIG. 3).

Figure 9B:
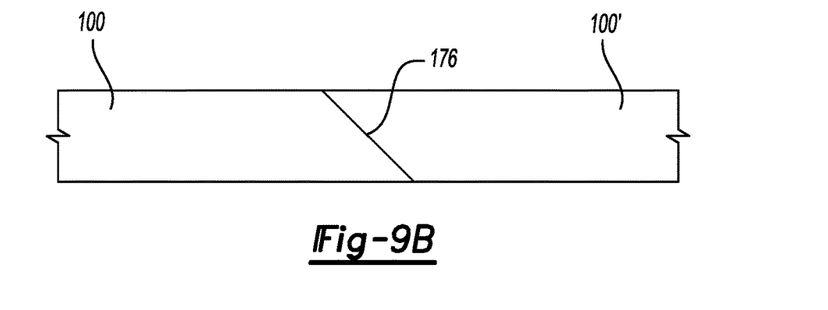
FIG. 9B shows an alternative interface between a layer of the bus bar of FIG. 3 and an extender layer.

In the example embodiment of FIG. 9B, the section 100 is joined to the extender section 100' with a spliced interface 176.

Figure 9C:
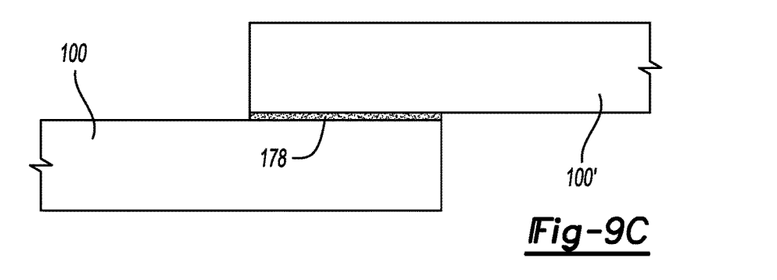
FIG. 9C shows an alternative interface between a layer of the bus bar of FIG. 3 and an extender layer.

In the example embodiment of FIG. 9C, the section 100 is joined to the extender section 100' along an overlapping interface 178, but the thickness of the section 100 and the extender section 100' is maintained.

Referring again to the bus bar 68 of FIG. 3, the section 100 is secured to the end portions 104, 108 via roll-forming. Other techniques could be used to secure the section 100 to the end portions 104, 108.

Figure 10A:
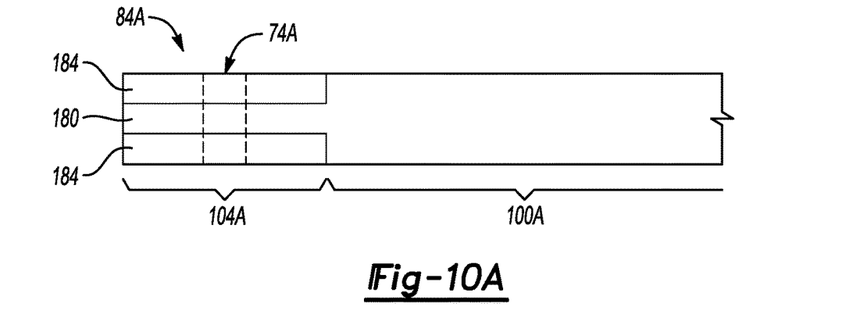
FIG. 10A shows another example end portion for use in connection with a layer of the bus bar of FIG. 3.

For example, as shown in FIG. 10A, in another example embodiment of a layer 84A for a bus bar includes a section 100A of a first material connected to an example end portion 104A. Another end portion that is similar to the end portion 104A can be secured an opposing end of the section 100A.

The end portion 104A includes an extension 180 from the section 100A and inlay claddings 184 placed against opposing sides of the extension 180. The extension 180 is made of a first material and the inlay claddings 184 are made of a second material different than the first material. In one example, the first material is aluminum and the second material is copper.

An aperture 74A extends through the extension 180 and the inlay claddings 184. The aperture 74A can receive the threaded terminal connector 72 (FIG. 2). The layer 84A can be stacked against other layers to provide a multi-layered bus bar.

Figure 10B:
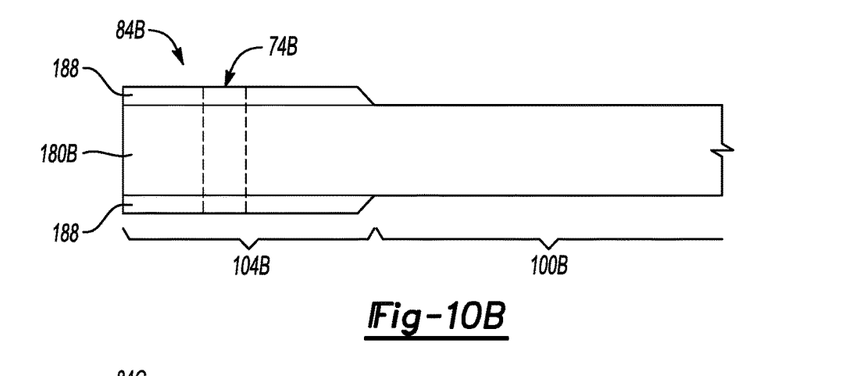
FIG. 10B shows another example end portion for use in connection with a layer of the bus bar of FIG. 3.

In another example embodiment shown in FIG. 10B, a layer 84B for a bus bar includes a section 100B of a first material connected to an example end portion 104B. Another end portion that is similar to the end portion 104B can be secured an opposing end of the section 100B.

The end portion 104B includes an extension 180B from the section 100B and a plating 188 deposited on each opposing sides of the extension 180B. The extension 180B is made of a first material and the platings 188 are made of a second material different than the first material. In one example, the first material is aluminum and the second material is copper.

An aperture 74B extends through the extension 180 and the platings 188. The aperture 74B can receive the threaded terminal connector 72 (FIG. 2). The layer 84B can be stacked against other layers to provide a multi-layered bus bar.

Figure 10C:
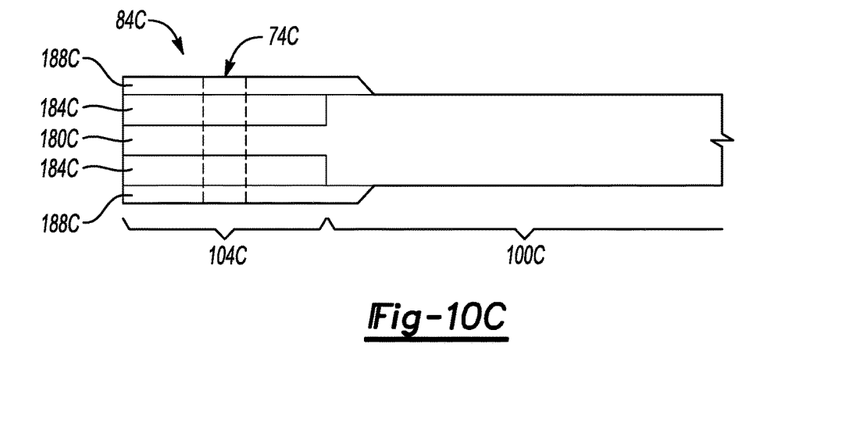
FIG. 10C shows another example end portion for use in connection with a layer of the bus bar of FIG. 3.

In another example embodiment shown in FIG. 10C, a layer 84C for a bus bar includes a section 100C of a first material connected to an example end portion 104C. Another end portion that is similar to the end portion 104C can be secured an opposing end of the section 100C.

The end portion 104C includes an extension 180C from the section 100C. Inlay claddings 184C are placed against opposing sides of the extension 180C. Platings 188C deposited on each opposing sides of the extension 180B. The example platings 188C cover a surface of the inlay claddings 184C and extend to contact a portion of the section 100C. The extension 180C is made of a first material and the platings 188 are made of a second material different than the first material. The inlay claddings 184C are also made of the second material. In one example, the first material is aluminum and the second material is copper. In another example, the inlay claddings 184C are copper, and the platings 188C are nickel.

An aperture 74C extends through the extension 180C, the inlay claddings 184C, and the platings 188C. The aperture 74C can receive the threaded terminal connector 72 (FIG. 2). The layer 84C can be stacked against other layers to provide a multi-layered bus bar.

Various other techniques could be used to provide a bus bar with a section of a first material, and end portions connected to the section. Where the end portions comprise a different, second material than the first material. Other techniques could include spraying the second material on the end portions, additive deposition, physical vapor deposition (PVD), chemical vapor deposition (CVD), or combinations thereof. For example, a bus bar layer could include, at one end, an end portion like the end portion 104, and an end portion at an opposite end like the end portion 104A. That is, the end portions for a bus bar layer should not be construed as limited to being formed using the same manufacturing forming technique.

Features of some of the disclosed examples include a relatively light-weight bus bar that includes multiple layers to facilitate bending. The bus bar incorporates a bi-metallic junction at each end to help share current between the layers.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A bus bar assembly, comprising:
   a first layer; and
   a second layer directly adjacent the first layer, the first layer and the second layer each having a section made of a first material and extending from a first end portion to an opposing, second end portion, the first and second end portions include a second material different than the first material,
   wherein the first end portion comprises an extension of the first material and a cladding of the second material, the extension extending from the section made of the first material, the cladding placed against a first side of the extension.

2. The bus bar assembly of claim 1, wherein the first material and the second material are metallic materials.

3. The bus bar assembly of claim 2, wherein the first material comprises aluminum and the second material comprises copper.

4. The bus bar assembly of claim 1, wherein the first material forms a non-conductive oxide layer under given atmospheric conditions at a first rate, and the second material forms a non-conductive oxide layer under the given atmospheric conditions at a second rate that is slower than the first rate.

5. The bus bar assembly of claim 1, comprising a soldering alloy covering at least some of the first and second end portions.

6. The bus bar assembly of claim 5, wherein the soldering alloy joins the first end portion of the first layer to the first end portion of the second layer, and the soldering alloy joins the second end portion of the first layer to the second end portion of the second layer.

7. The bus bar assembly of claim 1, wherein the first and second end portions are roll bonded to the section.

8. The bus bar assembly of claim 1, comprising a polymer coating covering the first layer and the second layer.

9. The bus bar assembly of claim 8, wherein the polymer coating extends across first interfaces between the first end portions and the sections of the first material, and across second interfaces between the second end portions and the sections of the first material.

10. The bus bar assembly of claim 1, comprising a first traction battery terminal and a second traction battery terminal, the first ends of the first and second layers secured directly to the first traction battery terminal, the second ends of the first and second layers secured directly to the second traction battery terminal.

11. The bus bar assembly of claim 10, wherein the first and second layers extend nonlinearly between the first traction battery terminal and the second traction battery terminal.

12. The bus bar assembly of claim 1, comprising an area of the section ultrasonically welded to another area of the section.

13. The bus bar assembly of claim 1, comprising at least one third layer directly adjacent the second layer, each of the at least one third layer having a section made of the first material and extending from a first end portion to an opposing, second end portion, the first and second end portions of the at least one third layer made of the second material that is different than the first material.

14. The bus bar assembly of claim 1, wherein the first end portion further comprises another cladding of the second material placed against an opposing, second side of the extension.

15. The bus bar assembly of claim 1, comprising a plating, wherein the cladding is sandwiched between the plating and the extension within the first end portion, and the plating extends to contact the section made of the first material.

16. The bus bar assembly of claim 1, wherein the first and second end portions include only the second material, such that none of the first material extends into the first and second end portions.

17. The bus bar assembly of claim 1, wherein the first and second end portions are made entirely of a material different than aluminum.

18. The bus bar assembly of claim 1, wherein the first and second end portions provide an aperture that extends through the first and second layers.

19. The bus bar assembly of claim 1, wherein the second material of the first end portion of the first layer interfaces directly with the second material of the first end portion of the second layer.

20. A bus bar assembly, comprising:
    a first layer directly adjacent a second layer,
    the first and second layers each having a section made of a first material, the sections each extending from a first end portion to an opposing, second end portion, the sections each having an extender section secured to the other portions of the section, the first and second end portions include a second material different than the first material.

21. The bus bar assembly of claim 20, wherein ultrasonic welds secure opposing ends of the extender section to the other portions of the section.

* * * * *